Figure 1:
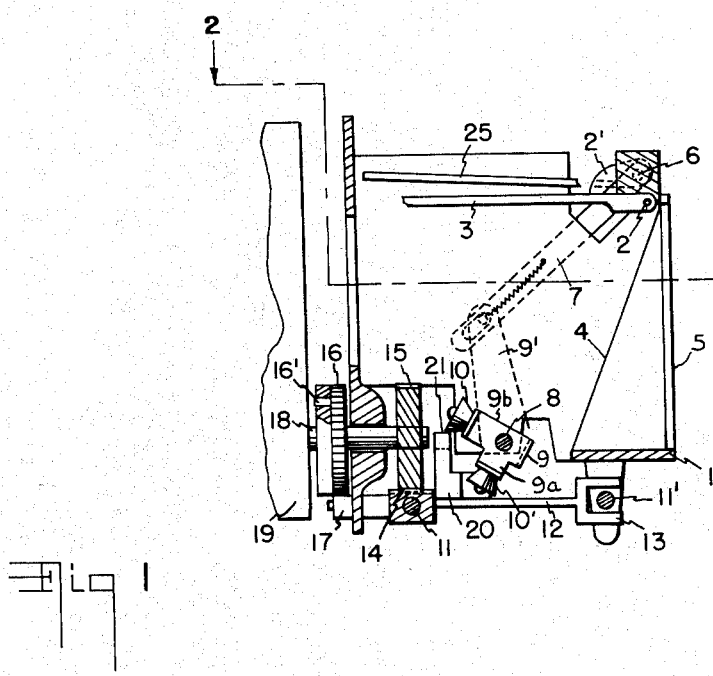

Sept. 19, 1961  A. GOLDHAMMER  3,000,285
MASK AND MIRROR ACTUATOR FOR REFLEX CAMERA
Filed Dec. 16, 1958

INVENTOR.
ALBERT GOLDHAMMER
BY
ATTORNEY

United States Patent Office 3,000,285
Patented Sept. 19, 1961

3,000,285
MASK AND MIRROR ACTUATOR FOR
REFLEX CAMERA
Albert Goldhammer, Nussdorf, Baden, Germany, assignor to Bodenseewerk Perkin-Elmer & Co., G.m.b.H., Uberlingen (Bodensee), Germany
Filed Dec. 16, 1958, Ser. No. 780,900
Claims priority, application Germany Dec. 19, 1957
7 Claims. (Cl. 95—42)

This invention is concerned with a reflex camera with a between-lens shutter.

With such cameras, it is well known in the art that a masking disk and the reflex mirror are moved into the viewing position by means of a control element which is actuated when the shutter is tensioned. After the shutter has been released, these elements perform a return movement to be tilted out of the light path before exposure is initiated. The control must be so effected that the masking disk tilted by the tensioning movement of the shutter has already closed the image window before the reflex mirror frees the view-finder opening. When releasing the shutter, the reflex mirror must have closed the view-finder opening before the masking disk frees the image window. The out-of-phase movements of the reflex mirror, the masking disk, and the shutter release have hitherto been controlled by means of a rotatable cam disk arranged concentrically with the optical axis. This cam disk is rotated by the shutter tensioning lever and returns together wtih the tensioning lever upon the release of the shutter. A rather complicated mechanical system is necessary with such an arrangement in order to correctly phase the movements of the reflex mirror and the masking disk from the rotating movement of the cam disk. Relatively short control movements and little space are available, so that the control device requires utmost precision in manufacturing.

The objects of this invention are to provide a control mechanism for the masking disk and the reflex mirror which is structurally simple and more appropriately shaped, that can be manufactured without requiring extreme accuracy, and that consists of fewer components.

According to the invention, the control member is designed as a control slide which is transversely movable with respect to the optical axis and coupled with the shutter tensioning shaft by means of a rack-and-pinion drive. The reflex mirror and the masking disk are guided positively by means of one compound lever arrangement provided for each of these elements and moving on cams of said control slide. Such a control slide can be conveniently arranged in the space beneath the image window and can therefore be designed as a relatively large and strong part.

The control slide is advantageously provided with two lifting cams arranged in two planes which are perpendicular to each other. Two bell crank levers of the compound lever system, which are arranged one behind the other in the direction of the slide movement, are rotated by one of the lifting cams during the shutter tensioning movement and by the other of the lifting cams during the releasing movement.

A positively actuated movement of the compound lever arrangement is obtained with such a design without necessitating slot guides with narrow tolerances or similar mechanical parts which are difficult to manufacture.

Further developing the idea of the invention, a ratchet disk cooperating with a detent actuated by the shutter release and coupled with the tensioning shaft of the shutter is arranged on the shaft of the pinion. As opposed to conventional arrangements, the shutter release and the control device are actuated directly by the shutter tensioning shaft which permits the realization of a considerable structural economy.

With prior art arrangements, the shutter is tensioned by means of a tensioning lever and the control member is actuated by the tensioning lever. Tensioning of the shutter of an improved camera conceived and constructed in accordance with the invention is effected by a hand lever operated crank gear which moves the control slide, so that the shutter tensioning shaft is rotated when the rack-and-pinion-drive of the control slide is actuated.

The invention is more fully described in the following detailed description where reference is made to a preferred embodiment of the invention illustrated schematically in the accompanying drawings.

Figure 2:
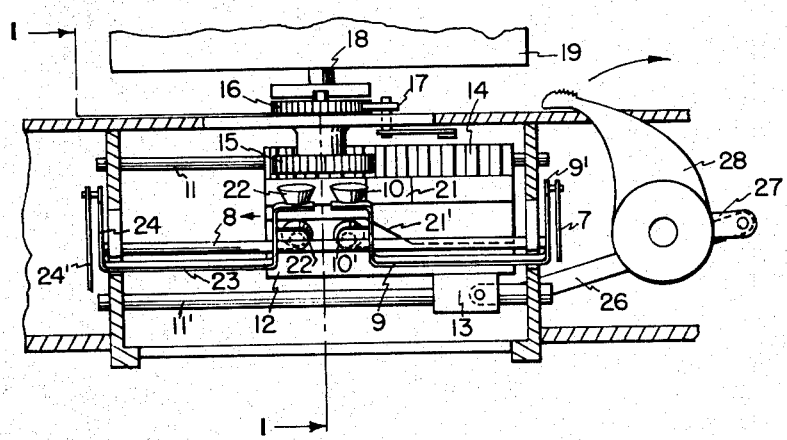

In the drawings:

FIG. 1 is a cross sectional elevation of a portion of a reflex camera embodying the invention; and FIG. 2 is a top view of the embodiment of FIG. 1.

In the embodiment selected for illustration, numeral 1 designates a housing in which a masking disk 3 is mounted rotatably at 2, said disk 3 being capable of masking the image window 5 when in an inclined position 4. The masking disk 3 has a flap 2', which is formed by bending a portion of the disk. A guide lever 7 is pivoted at 6 on the flap 2'. The guide lever 7 is connected with a control lever 9' which is fulcrumed on the bearing pin 8. The control lever 9' is a bent flap of a sheet metal part 9 which supports guide rollers 10, 10' on two further flaps 9a and 9b forming a bell crank, the axes of the guide rollers being arranged perpendicularly to each other.

A guide pin 11 is mounted in the housing 1. A control slide 12, which is guided by means of a fork shaped member 13 along a second guide pin 11' moves on the first mentioned guide pin 11. A rack 14, which is engaged by a pinion 15 mounted on the housing 1, is supported by the control slide 12. A ratchet wheel 16 cooperating with a releasable detent 17 is mounted on the shaft of the pinion 15. The ratchet wheel 16 is coupled with the tensioning shaft 18 of a between-lens shutter 19 by means of a coupling pin 16'. A cam body 20 with two lifting cams 21, 21' is mounted on the control slide 12. The lifting cams 21, 21' are arranged in planes which are perpendicular to each other. The vertical lifting cam 21 cooperates with the guide roller 10, while the horizontal lifting cam 21' is provided to cooperate with the guide roller 10'. Rollers 10 and 10' control the position of mask 3. Alongside guide rollers 10, 10' is arranged a second pair of guide rollers 22, 22' supported by a sheet metal part 23 corresponding in shape and size to the sheet metal part 9. The guide rollers 22, 22' have the function of controlling the movement of reflex mirror 25 which is pivoted above the masking disk 3. This control is effected through a compound lever arrangement 24, 24' which corresponds to the lever system 7, 9'.

A crank rod 26 which is pivoted on a crank arm 27 engages the fork shaped projection 13 of the control slide 12. The crank arm 27 is driven by a winding lever 28 when the latter performs a rotation in a clockwise direction as seen in FIG. 2.

When the winding lever 28 is moved in the direction of the arrow, the control slide 12 is moved towards the left (in the direction of the arrow) by the action of the compound lever arrangement 26, 27. This movement of the control slide causes the rack 14 to drive the pinion 15 thereby rotating the tensioning shaft 18 of the shutter 19 until the detent 17 engages the ratchet disk 16. The shutter is now tensioned and is retained in this tensioned position by the detent 17.

During this winding translational movement of the control slide 12, the guide roller 10' contacts the horizontal lifting cam 21', while the vertical lifting cam 21 releases the guide roller 10. Consequently, the bell crank lever 9' is rotated in counter clockwise direction (FIG. 1) whereby the masking disk 3 is tilted downwards by the action of the compound lever arrangement 9', 7 to lie in the inclined position 4. When this operation is completed and control slide 12 continues to move in the same direction, the guide roller 22' comes in contact with the horizontal lifting cam (21'). The reflex mirror 25 is similarly tilted downwards into the viewing position by means of the lever arrangement 23, 24, 24'.

If now the shutter is released by operating the detent 17, the tensioning shaft 18 of the shutter 19 rotates in the opposite direction and drives the control slide 12 through the rack-and-pinion drive 14, 15, so that the control slide 12 returns to its initial position. During this action, the guide roller 22 comes in contact with the vertical lifting cam 21, while the guide roller 22' is released by the horizontal lifting cam 21'. The bell crank lever 23 is thereby rotated in clockwise direction (FIG. 1) and the reflex mirror is tilted up, so that it covers the viewing opening. Then, the guide roller 10 also comes in contact with the lifting cam 21 and the masking disk 3 is also tilted out of the ray path by the action of the lever arrangement 9, 9', 7. The tensioning shaft 18 controls the shutter in such a way that the exposure is effected with the masking disk 3 tilted out of the light path.

I claim:

1. A reflex camera comprising a casing having a front wall with a radiation permeable opening therein, a top wall adapted to transmit a reflected image of an object to be photographed, and a back wall adapted to transmit radiation to a radiation sensitive material; shutter means in said opening positioned to control the passage of radiation therethrough; mask means pivoted to alternately block the passage of radiation to said radiation sensitive material and from said top wall; mirror means pivoted to alternately block the passage of radiation from said top wall and to reflect radiation from the front wall opening to the top wall; control slide means adapted to move linearly within said casing; cam means on said control slide means; cam rider means adapted to be actuated by said cam means to control the movement of each of said mirror means and said mask means; and external lever means for positioning said control slide means.

2. A reflex camera comprising a casing having a front wall with a radiation permeable opening therein, a top wall adapted to transmit a reflected image of an object to be photographed, and a back wall adapted to transmit radiation to a radiation sensitive material; shutter means in said opening positioned to control the passage of radiation therethrough; mask means pivoted to alternately block the passage of radiation to said radiation sensitive material and from said top wall; mirror means pivoted to alternately block the passage of radiation from said top wall and to reflect radiation from the front wall opening to the top wall; control slide means adapted to move within said casing transversely to the optical axis; cam means on said control slide means; first cam rider means adapted to be actuated by said cam means and to control the movement of said mask means; second cam rider means adapted to be actuated by said cam means and to control the movement of said mirror means; rack gear means on said control slide means to move therewith; shutter tensioning means including pinion gear means meshing with said rack gear means; external lever means for positioning said control slide means; and shutter tension releasing means.

3. The apparatus of claim 2 wherein said cam means comprises two cams positioned in perpendicular planes.

4. The apparatus of claim 2 wherein each of said first and second cam rider means rotates about an axis parallel to the direction of movement of said cam means.

5. The apparatus of claim 4 wherein said first cam rider means includes lever means in actuating relationship to said mask means and said second cam rider means includes lever means in actuating relationship to said mirror means.

6. The apparatus of claim 4 wherein the axes are along a common shaft.

7. A reflex camera comprising a casing having a front wall with a radiation permeable opening therein, a top wall adapted to transmit a reflected image of an object to be photographed, and a back wall adapted to transmit radiation to a radiation sensitive material; shutter means in said opening positioned to control the passage of radiation therethrough; mask means pivoted to alternately block the passage of radiation to said radiation sensitive material and from said top wall; mirror means pivoted to alternately block the passage of radiation from said top wall and to reflect radiation from the front wall opening to the top wall; a plurality of parallel track means extending between the side walls of said casing and located between the front and back walls thereof; control slide means positioned to travel along said tracks and including actuating means extending without said casing in operating relationship to said control slide means; rack gear means on said control slide means; pinion gear means meshing with said rack means and affixed to shaft means supported by said casing; shutter tensioning means driven by said shaft means; ratchet means on said shaft means; pawl means positioned to intercept said ratchet means and hold the shutter in a tensioned condition; said pawl means including shutter release means for removing said pawl means from engaging relationship with said ratchet means; first and second operating cam means on said control slide means, the profiles of said cams lying in substantially perpendicular planes having their line of intersection parallel to the direction of movement of said control slide means; first control lever means in operating relationship to said mask means; second control lever means in operating relationship to said mirror means; axle means parallel to said track means adapted to function as a pivot for each of said first and second lever means; first and second cam follower means on each of said control lever means, said cam follower means being positioned on substantially perpendicular axes whereby said first cam follower rides against said first operating cam and said second cam follower rides against said second operating cam.

References Cited in the file of this patent

UNITED STATES PATENTS

| | | |
|---|---|---|
| 1,272,292 | Menns | July 9, 1918 |
| 2,371,524 | Kals | Mar. 13, 1945 |
| 2,887,019 | Dodin | May 19, 1959 |